United States Patent [19]

Sohda

[11] 4,251,486
[45] Feb. 17, 1981

[54] METHOD AND APPARATUS FOR DECOMPOSING INJURIOUS SUBSTANCES

[76] Inventor: Senju Sohda, 2-61-10, Hagoromo-cho, Tachikawa-shi, Tokyo, Japan

[21] Appl. No.: 972,342

[22] Filed: Dec. 22, 1978

Related U.S. Application Data

[62] Division of Ser. No. 916,556, Jun. 19, 1978.

[30] Foreign Application Priority Data

Nov. 16, 1977 [JP] Japan ................................ 52/137373
Dec. 30, 1977 [JP] Japan ................................ 52/158950

[51] Int. Cl.³ .................... B01D 47/02; B01J 10/00; B01D 50/00; B01F 7/16
[52] U.S. Cl. ............................... 422/170; 261/121 R; 422/189; 422/225; 422/231; 422/234; 55/223; 55/256; 210/252
[58] Field of Search ........... 261/21, 29 R, 116, 121 R; 422/188, 189, 234, 235, 224, 169, 170, 172, 111, 225, 62; 55/168, 223, 256; 210/59, 252

[56] References Cited

U.S. PATENT DOCUMENTS

| | | | |
|---|---|---|---|
| 2,719,032 | 9/1955 | Schnur | 55/256 X |
| 3,486,307 | 12/1969 | McDermott | 55/256 X |
| 3,989,465 | 11/1976 | Onnen | 422/170 X |
| 4,039,307 | 8/1977 | Bondor | 261/21 |
| 4,086,321 | 4/1978 | Holley | 422/189 X |
| 4,155,977 | 5/1979 | Baker | 422/170 |
| 4,156,712 | 5/1979 | Kanai et al. | 261/121 R |

*Primary Examiner*—Michael S. Marcus
*Attorney, Agent, or Firm*—McGlew and Tuttle

[57] ABSTRACT

An apparatus for decomposing injurious substances to form non-injurious substances comprising a first reaction vessel, an injurious substance inlet connected to the first reaction vessel for supplying an injurious substance containing only one of an oxygen or hydrogen donor substance, and at least one further reaction vessel connected to the first reaction vessel. A mixing vessel connected to the at least one further reaction vessel is provided with the first reaction vessel, the further reaction vessel and the mixing vessel containing an aqueous solution of sodium carbonate. Conduits may be provided between the first reaction vessel, further reaction vessel and mixing vessel, permitting circulation of the aqueous sodium carbonate solution. A feeding device is connected between the mixing vessel and the first reaction vessel for feeding the aqueous sodium carbonate solution therebetween and into association with the injurious substances supplied to the first reaction vessel. Injurious substances are fed by other feeding devices to the mixing vessel for supplying only one of the hydrogen donor or oxygen donor substances. The other of the hydrogen donor and oxygen donor substances are supplied to the injurious substance inlet of the first reaction vessel and water purification devices are connected to the mixing vessel for purifying water coming therefrom.

1 Claim, 7 Drawing Figures

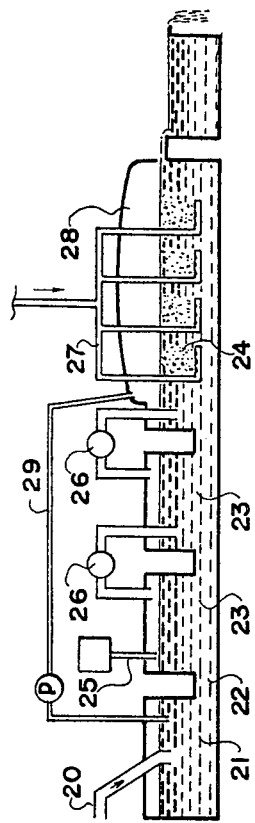

METHOD AND APPARATUS FOR DECOMPOSING INJURIOUS SUBSTANCES

This is a division of application Ser. No. 916,556 filed June 19, 1978.

BACKGROUND OF THE INVENTION

FIELD OF THE INVENTION

The present invention relates in general to an apparatus for decomposing injurious substances to make them harmless and more particularly to an apparatus for decomposing injurious substances to make them harmless by an aqueous solution of sodium carbonate as the main component containing an oxygen donor such as nitric acid or oxygen or a hydrogen donor such as ammoniac or hydrogen.

A wide spectrum of new industrial and technical processes have been relatively recently developed which, although generally benefiting the human condition, produce various toxic or injurious substances. The treatment of these substances is an ever increasing problem.

There are many injurious substances which must be treated properly to deodorize them and neutralize their toxicity. Some examples are toxic gases such as COx, NOx and SOx contained in waste gases of automobiles. Others are the $SO_2$ and $H_2S$ produced from the iron and refining industries, COx and SOx produced from petroleum complexes and other gases giving offensive odors from, for example, the iron and pulp industries. A number of toxic substances may also be contained in waste waters from other industries or be the product of organic excrements.

Various methods have been proposed for physically and chemically decomposing these many injurious substances to make nontoxic substances. However, such methods are incomplete for this purpose and in many cases, may cause air pollution and other secondary pollution. Such treating agents which may satisfy the above requirements have not been developed as of yet.

The present invention has been completed with our eager studies for the purpose of solving the problems described above.

SUMMARY OF THE INVENTION

The present invention relates to an apparatus for decomposing injurious substances to form nontoxic ones wherein an aqueous solution of sodium carbonate is used as a main treating agent to which an oxygen donor such as oxygen, nitric acid, sulfuric acid, nitrogen oxides, carbon oxides or sulfur oxides for oxidizable injurious substances, or a hydrogen donor such as ammoniac, hydrogen or mercaptan for reducible injurious substances is added.

Examples of the oxygen donors used for the oxidizable injurious substances to be decomposed are carbon oxides such as carbon monoxide and carbon dioxide; organic acids such as formic acid, acetic acid, propionic acid and butyric acid; alcohols such as butyl alcohol and amyl alcohol; aldehydes such as formaline, methyl aldehyde and proy ion aldehyde; various nitrogen oxides represented by Nox; and sulfur oxides such as sulfur dioxide and sulfur trioxide. Examples of the hydrogen donors used for the reducible injurious substances are sulfur compounds such as hydrogen sulfide, ammonium sulfate, methyl mercaptan, ethyl mercaptan, ethyl sulfide, propyl sulfide and phenyl sulfide; and nitrogen compounds such as ammonia, methyl amine, ethyl amine and diethyl amine.

Since each of the injurious substances can act as the oxygen donor or the hydrogen donor, it is also possible to decompose the injurious substances by reacting both the reducible and oxidizable substances with each other using these respective agents in the aqueous sodium carbonate solution. It is preferable in this case to separatedly introduce the reducible and oxidization injurious substances into the aqueous solution.

The present invention exhibits an advantage that according to the invention the injurious substances may be decomposed completely without any danger of causing secondary pollutions.

Accordingly an object of the present invention is to provide an apparatus in which an oxygen donor substance is combined with an aqueous solution of sodium carbonate to form a mixture and a hydrogen donor substance is then added to the mixture to react with the oxygen donor substance and form non-injurious substances, at least one of the oxygen and/or hydrogen donor substances being the injurious substances to be decomposed.

Another object of the present invention is to provide an apparatus in which an aqueous solution of sodium carbonate is mixed with a hydrogen donor substance to form a mixture, and an oxygen donor substance is added and mixed with the mixture to react the hydrogen and oxygen donor substances with each other to form non-injurious substances, at least one of the hydrogen and oxygen donor substances comprising the injurious substances to be decomposed.

A further object of the present invention is to carry out the aforementioned reactions in the presence of dichlorobenzene.

A still further object of the present invention is to provide an apparatus which is simple in design, rugged in construction, and economical to utilize.

These and other embodiments and advantages of the present invention will become more apparent from the following detailed description by way of example only, with reference made to the accompanying drawings.

BRIEF DESCRIPTION OF THE DRAWINGS

FIG. 2A is a plan view of a counterflow spray decomposition vessel, with a portion broken away;

FIG. 2B is a schematic side elevational view, in section, of the counterflow spray decomposition vessel FIG. 2A;

FIG. 3 is a schematic flow of diagram the embodiment of FIG.1;

FIG. 4 is a side elevational view, in section, of a further embodiment according to the present invention;

FIG. 5 is a graph showing a relationship of the aqueous solution to the decomposition efficiency.

DESCRIPTION OF THE PREFERRED EMBODIMENT

Figure 1:
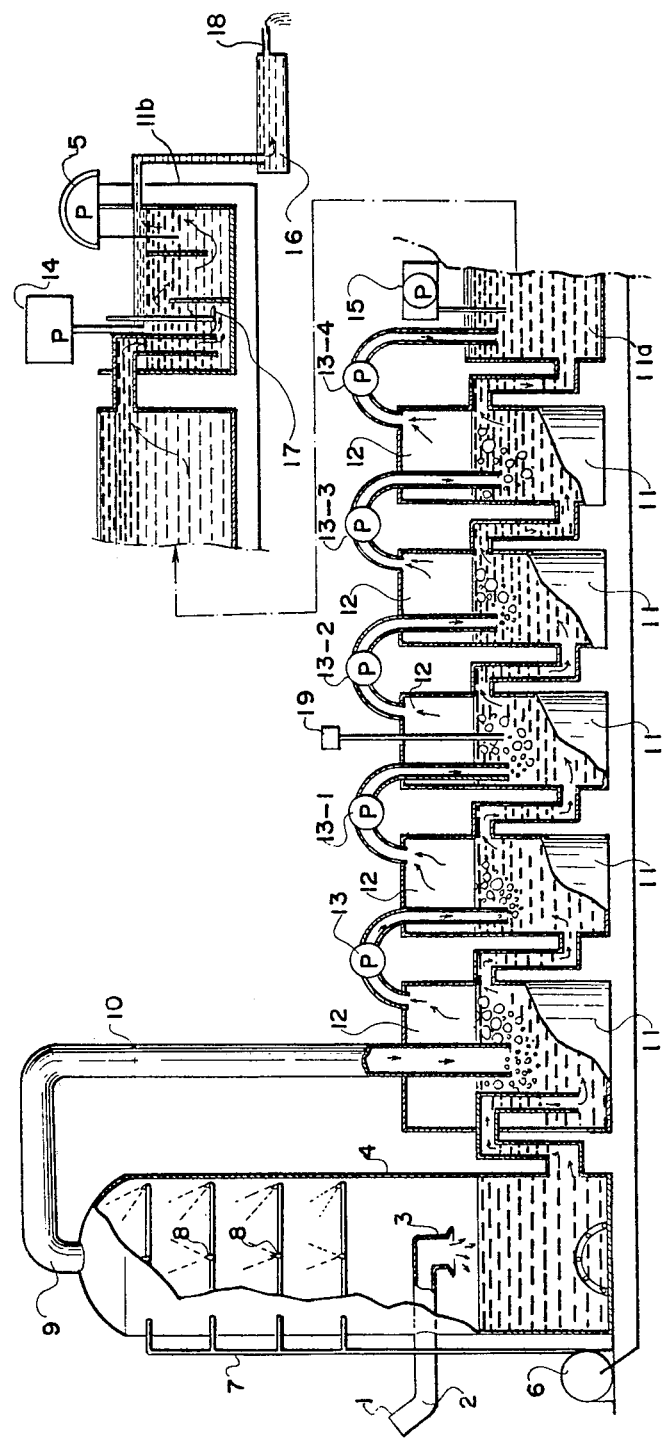
FIG. 1 is a side elevational view, in section of an embodiment showing an apparatus which may be used for carrying out the method according to the present invention.

Referring to FIG. 1, a schematic view is shown of an embodiment of an apparatus is used in accordance to the present invention, wherein the apparatus designed to be used for decomposing an injurious gas. The apparatus comprises an inlet 1 for the injurious gas to be treated, an introducing pipe 2 for the injurious gas, a discharge opening 3 for the injurious gas which is connected into a first reaction vessel in the form of a counterflow spray decomposition tower 4. A feed means 5 is provided for feeding treating agents from a vessel 11b according to the invention. A pressure pump 6 is connected to a transporting pipe 7 having nozzles 8 to bring agent from means 5 to tower 4. A gas outlet 9 of the decomposition tower 4 is provided with an introducing pipe 10 for gas which has not been decomposed in tower 4. Reaction vessels 11 are connected in series to the bottom of tower 4 with a gas reservoir portion 12 within each of the reaction vessels 11. Gas transporting pumps 13, 13-1, 13-2, 13-3 and 13-4 are provided between adjacent vessels 11 and means 14 is provided at the end of the series for feeding oxygen, oxygen donors, hydrogen or hydrogen donors. An automatic addition means 15 is connected to the last vessel 11a in the series and includes a pH regulator. A water purifier 16 is connected to the vessel 11b which has a mixer 17 for mixing the agents therein. Purifier 16 has a drain hole 18. An automatically regulated pump 19 is connected to one of the vessels 11.

FIG. 2B shows a vertical sectional view 2A shows and a partially enlarged horizontally sectional view 2a shows of the interior of the counterflow spray decomposition tower 4.

FIG. 3 is an explanatory diagram showing an arrangement of the embodiment of FIG. 1. The injurious gas which will be decomposed and made nontoxic is passed through the introducing pipe 2 to the injurious gas discharge opening 3 from which the gas is introduced into the counterflow spray decomposition tower 4.

In the counterflow spray decomposition tower, the injurious gas is decomposed and the decomposition products are taken down into the water in the bottom of the decomposition tower by the spray from nozzles 8 which contact the injurious gas, which is travelling upwards in the decomposition tower from the discharging hole 3 to the outlet 9, nozzle 8 spray the aqueous solution of the treating agents, which has been prepared in the treating agent vessel 11b by the mixer 17 and then sprayed into the decomposition tower from the nozzles 8 after passing through the transporting pipe 7 by the action of the pressure pump 6. In this case, it is to be understood that spraying rates from the nozzles 8 may be varied according to discharging rates of the injurious gas from the discharging hole 3 and may be regulated by the pressure pump 6.

The remaining gas which has not been decomposed in the first reaction vessel or counterflow decomposition tower 4 is introduced into the first reaction vessel 11 from the gas outlet 9 through the introducing pipe 10. Each of the reaction vessels 11 has been supplied with the aqueous solution of the treating agents corresponding to those sprayed into the spraying tower 4. The injurious gas which has not been decomposed initially in tower 4 is decomposed in the reaction vessels 11 while passing through the solution in the vessels by bubbling the gas through solution. Any remaining gas not having been decomposed in each of the reaction vessels 11, is collected in the gas reservoir located at the upper portion of the reaction vessel, and then introduced into the next reaction vessel by the transporting or suction pump 13, 13-1, 13-2, 13-3 and 13-4 successively, repeating the decomposition reaction described above. It is also possible to directly introduce the injurious substances into the reaction vessels in place of the counterflow spray decomposition tower, depending on concentrations of the substances. From the above description, it will be apparent that the number of the reaction vessels may be changed depending on the nature and concentrations of the injurious substances. In this case, if a vacuum pump is used in each of the reaction vessels for the purpose of increasing the gas collection efficiency, the result obtained according to the present invention may be much improved, avoiding, at the same time, damages in the pumps.

The treating agent solutions according to the present invention constitutes an aqueous of from solution of about 0.2% to 60% sodium carbonate and, preferably from 10% to 30%, to which the oxygen donors such as nitric acid and oxygen, or the hydrogen donors such as ammonia and hydrogen are added. The nature and amounts of these oxygen or hydrogen donors may be selected depending on the nature and amounts of the injurious gases or substances to be decomposed.

The oxygen donors are used for the oxidizable substances, for example hydrogen sulfide, ammonia, trimethyl amine and acetoaldehyde, to be decomposed, and the hydrogen donors are used for the reducible substances, for example sulfur dioxide gas, carbon monoxide, ozone, sodium hypochlorite and nitrogen oxide, to be decomposed, in a stoichiometrically required amount or more, respectively.

The hydrogen or oxygen donors are fed into the aqueous sodium carbonate solutions via the feeding equipment 14.

As described above, the oxidizable injurious substances act as the oxygen donors on the reducible injurious substances, on the contrary, the reducible injurious substances act as the hydrogen donors. For this reason, if the undecomposed injurious substances introduced through the pipe 10 into reaction vessels 11 are those which are reducible it is possible to carry out the process in such a way that oxidizable injurious substanced are fed from the feeder 14 and contact the reducible injurious substances in the reaction vessels 11, both the injurious substances this being decomposed by each other and made nontoxic. On the other hand, it is also possible to introduce oxidizable injurious substances through pipe 10 and reducible injurious substances from feeder 14.

According to the present invention, injurious substances in the form liquid solution may also be treated by means of similar apparatus to that in the foregoing embodiment. There is shown in FIG. 4 an apparatus suitable for decomposing injurious substances in solution, which apparatus comprises an introducing pipe 20, a storage vessel 21, conduits 22, reaction vessels 23, a mixing vessel 24, a feeder 25 for the treating agents according to the present invention, gas transferring pump 26, a blast pipe 27 for air to be mixed, a gas reservoir 28 located at an upper portion of the mixing vessel 24 and a circulation pipe 29 for recycling the gases from the mixing vessel 24 and the gas reservoir 28 to the storage vessel 21.

In this embodiment of the present invention, the injurious substances are introduced through the introducing pipe 20 into the storing vessel 21. The storing vessel 21, the reaction vessels 23 and the mixing vessel 24 are connected by the respective conduits 22 with the storage vessel 21 connected to a first reaction vessel 23 in the series.

The solution containing the injurious substances which have been introduced into the storing vessel 21 is passed to the reaction vessels 23, while the treating agents according to the invention are fed from the reaction agent feeder 25, and the injurious substances are mixed with the agents and decomposed. In this case, it is also understood that the reducible or oxidizable injurious substances may be used as the treating agents. The apparatus may comprise only one reaction vessel but two or more reaction vessels may also be provided if the decomposition is insufficient according to, for example, amounts and flow rate of the injurious substances. The solution of injurious substances which undergoes decomposition in the reaction vessels is then passed to the mixing vessel 24 for their mere complete decomposition, into which air to be mixed or the oxygen donor is introduced and the decomposition is promoted. The injurious substances which have escaped in the form of gas into the gas reservoir 28 located at the upper portion of the mixing vessel or air mixing vessel 24 are recycled via the pipe 29 into the storing vessel 21 and subjected to the decomposition from the first stage.

The relationship between the injurious substances in solution and the treating agents is all the same as that in the foregoing embodiment regarding the gaseous injurious substances. There is shown in FIG. 5 the relationship between the temperatures of the aqueous sodium carbonate solutions containing a treating agent according to the present invention and the decomposition efficiencies. From the result shown in FIG. 5, it is advantage to carry out the present invention at a temperature of from 5° C. to 90° C., preferably from 10° C. to 85° C.

It has been found that the combined use of dichlorobenzene with the treating agents according to the present invention may also be serviceable for increasing the effect of the invention, such increased effect has been observed particularly in cases where sodium hypochlorite or ammonia is contained as lately described in the EXAMPLES. Amounts of dichlorobenzene used may vary according to amounts of the injurious substances to be decomposed and it is preferable to use dichlorobenzene in an amount of from 1% to 10% of the weight of sodium carbonate used.

After decomposing the injurious substances according to the method of the present invention, as obvious from the following Examples, no injurious substance remains at the drain hole, the amount of water is slightly increased, while the concentration of sodium carbonate is almost constant or slightly decreased and there is observed no great change. Accordingly, it seems that the injurious substances are completely decomposed to give water and elements and that sodium carbonate may be restored to its orginal state even if it may be decomposed in the course of reaction.

As described in detail the preferred embodiments of the present invention causes the injurious substances may be decomposed completely in either their gas or solution form, to give off water and elements. Therefore there is no danger of causing air pollution and secondary pollutions. In addition, sodium carbonate, the main component of the treating agents, are scarcely decreased, and therefore the present invention is economical and may contribute not only to the protection of underground resources but also to the prevention if pollutions and the development of industries because the apparatus suffers from only slight corrosion.

The present invention will be described in the following EXAMPLES. It is to be understood that the present invention is not limited by these EXAMPLES.

EXAMPLE 1

A gas containing 10,000 ppm parts per million of hydrogen sulfide was decomposed by using an apparatus similar to that of FIGS. 1–3. The results obtained are given in the following table, the reaction temperature being 50° C.

|  | Injurious gas | Content of $H_2S$ at inlet | Concentration of $Na_2CO_3$ in treating solution and its feeding amount | Feeding amount of oxygen | Remained $H_2S$ | Change in water amount | Change in concentration of $Na_2CO_3$ |
|---|---|---|---|---|---|---|---|
| After 1 hour | 28 l/min. | 10,000 ppm | 30% 80 l/min. | 5,000l | none | increased | no change |
| After 2 hours | 28 l/min. | 10,000 ppm | 30% 80 l/min. | 5,000l | none | increased | slightly decreased |
|  | 28 l/min. | 10,000 ppm | 30% 80 l/min. | 5,000l | none | increased | slightly decreased |

EXAMPLE 2

When ammonia, trimethyl amine and acetoaldehyde were decomposed in a manner similar to that described in EXAMPLE 1 at a reaction temperature of 60° C., respectively, the following results were obtained.

|  | Injurious gas | Content of $H_2S$ at inlet | Concentration of $Na_2CO_3$ in treating solution and its feeding amount | Feeding amount of oxygen | Remained $H_2S$ | Change in water amount | Change in concentration of $Na_2CO_3$ |
|---|---|---|---|---|---|---|---|
| Ammonia |  |  |  |  |  |  |  |
|  | 28l/min. | 400 ppm | 80l/min. 30% | 300l | 0 | increased | no change |

| Injurious gas | Content of H$_2$S at inlet | Concentration of Na$_2$CO$_3$ in treating solution and its feeding amount | Feeding amount of oxygen | Remained H$_2$S | Change in water amount | Change in concentration of Na$_2$CO$_3$ |
|---|---|---|---|---|---|---|
| After 1 hour | | | | | | |
| 28l/min. | 400 ppm | 80l/min. 30% | 300l | 0 | increased | slightly decreased |
| After 2 hours | | | | | | |
| 28l/min. | 400 ppm | 80l/min. 30% | 300l | 0 | increased | slightly decreased |
| Trimechyl ammine | | | | | | |
| 28l/min. | 100 ppm | 80l/min. | 300l | 0 | increased | no change |
| After 1 hour | | | | | | |
| 28l/min. | 100 ppm | 80l/min. 30% | 300l | 0 | increased | slightly decreased |
| Triethyl amine | | | | | | |
| 40l/min. | 10,000 ppm | 30% (300cc of aq. solution) | aq. solution of 270 g of sodium percarbonate | 0 | increased | slightly decreased |
| Acetoaldehyde | | | | | | |
| 15l/min. | 20 ppm | 80l/min. 30% | 10l | 0 | increased | no change |

EXAMPLE 3

When reducible substances, sodium hypochlorite, sulfur dioxide, ozone, carbon monoxide and carbon dioxide were decomposed in a manner similar to that described in EXAMPLE 1 at a reaction temperature of 50° C., respectively, the following results were obtained.

| Injurious gas | Content of H$_2$S at inlet | Concentration of Na$_2$CO$_3$ in treating solution and its feeding amount | Feeding amount of oxygen | Remained H$_2$S | Change in water amount | Change in concentration of Na$_2$CO$_3$ |
|---|---|---|---|---|---|---|
| Sodium hypochlorite | | | | | | |
| 28l/min. | 10,000 ppm | 30% 80l/min. | NH$_3$ 15cc | 0 | no change | no change |
| Sulfur dioxide | | | | | | |
| 28l/min. | 10,000 ppm (1%) | 30% 80l/min. | NH$_3$ 15cc | 0 | no change | no change |
| 28l/min. | 400 ppm 10,000 (1%) | 30% 80l/min. | NH$_3$ 20cc | 0 | no change | slightly increased |
| Ozone | | | | | | |
| 28l/min. | 200 ppm | 30% 80l/min. | H$_2$ 400–450 | 0 | increased | no change |
| Carbon monoxide | | | | | | |
| 28l/min. | 1,000 ppm | 30% 80l/min. | stearic acid 10g | 0 | increased | no change |
| Nitrogen dioxide | | | | | | |
| 28l/min. | 30 ppm | 30% 80l/min. | NH$_3$ 10cc | 0 | increased | no change |
| | 1,000 | " | " | 0 | " | " |

EXAMPLE 4

Various injurious substances were decomposed by an apparatus shown in FIGS. 1–3 at a reaction temperature of 40° C., where an aqueous solution of the following composition was used as treating solution: The solution consists of an aqueous solution containing 20% of a mixture of sodium carbonate and hydrogen peroxide in a molar ratio of 1:2, and 3%, based on the weight of sodium carbonate, of 0-dichlorobenzene. The results obtained are given in the following table.

| Injurious substances | | Feeding rate | Result of panel test |
|---|---|---|---|
| Hydrogen sulfide | 1,900 ppm | | |
| Ammonia | 130 ppm | 20l/min. | not detected |

| | | | |
|---|---|---|---|
| Methyl mercaptan | 0.6 ppm | | |
| Hydrogen sulfide | 250 ppm | | |
| Ammonia | 650 ppm | 20l/min. | not detected |
| Trimethyl amine | 1.0 ppm | | |
| Methyl mercaptan | 0.8 ppm | | |

The panel test was carried out by detecting tubes of Kitagawa type.

EXAMPLE 5

A gas containing hypochlorous acid gas was decomposed at a reaction temperature of 45° C., according to the conditions described in EXAMPLE 4, wherein an amount of 0-dichlorobenzene added was 2% based on the weight of sodium carbonate and tree reaction vessels were used. The results obtained are given in the following table.

|  | Initial gas | In the first vessel | In the second vessel | In the third vessel | At drain hole |
|---|---|---|---|---|---|
| Concentration of hypochlorous acid gas | 1,000 ppm | 500 ppm | 3–5 ppm | 0 | 0 |

The feeding rate of gas was 20 l/min.

EXAMPLE 6

When a gas containing hypochlorous acid gas was decomposed at a reaction temperature of 40° C. by using the same treating solution as in EXAMPLE 5 and five reaction vessels, the following results was obtained.

| Feeding rate | Hypochlorous acid gas | Result of panel test |
|---|---|---|
| 20/min. | 1,000 ppm | not detected |

EXAMPLE 7

Figure 6:
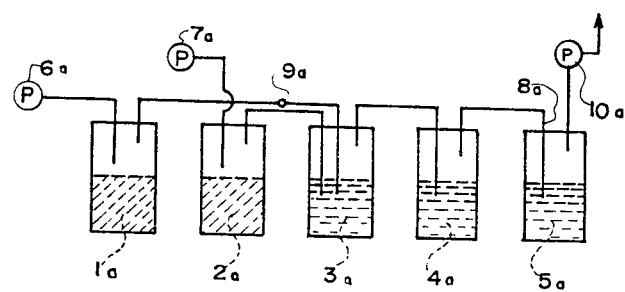
FIG. 6 is a side elevational view, in section, of a still further apparatus which is used in Examples 7 and 8 hereinafter.

In this case, an experiment was carried out with an apparatus shown in FIG. 6, wherein 1a is a vessel containing nitric acid, 2a is a vessel containing materials which produce offensive odors and injurious substances, for example feces, 3a, 4a and 5a are vessels each containing 5% aqueous solution of sodium carbonate, 6a is a pressure pump with a feeding rate of 6 l/min., 7a is a pressure pump with a feeding rate of 20 l/min., 8a is an exhaust vent and 9a is a gas pressure adjusting valve.

The experiment was carried out in this apparatus an follows: Feces producing or generating injurious substances having offensive odor was given in the closed vessel 2a, and then nitric acid vapor from the vessel 1a was contacted in the 5% aqueous solution of sodium carbonate contained in the vessels 3a, 4a and 5a with the injurious substances having offensive odor produced in the vessel 2a, and the exhaust gas discharged from the exhaust vent 8a was determined on the presence of offensive odors and nitric acid.

The apparatus may be provided with a suction pump 10a, and the reaction vessels are connected with each other successively by pipes so that the gas fed by the pressure pumps 6a and 7a or sucked by the suction pump 10a is introduced into the first vessel 1a or the second vessel 2a and then the third vessel 3a where the gas was mixed with the solution, leaves the third vessel 3a and passed through the fourth vessel 4a and the fifth vessel 5a to the exhaust vent 8a. The reaction time may be about 6 min. in each vessels.

On the other hand, five reaction vessels were provided for testing the increase in water amount. In this case, no explosion was observed owing to the mixing and reacting of hydrogen radicals with oxygen radicals.

In the experiment, the offensive odors produced from the raw feces comprised mainly 1,500 ppm of hydrogen sulfide, and other components.

The reaction time was more than 10 hrs. in each experiment. The deodorization and decomposition effects were evaluated by an organoleptic test and pH indicating paper. The experiments were also carried out by using a concentration of 10% of sodium carbonate besides 5%.

The resuls obtained are given in Table 1. When the similar experiment as above was carried out, wherein the reducible injurious substances were introduced into either vessel 1a or 2a and the oxidizable injurious substances were introduced into the other vessel 1a or 2a, the results given in Table 2 were obtained.

TABLE 1

| Material producing offensive odor | Concentration of $Na_2CO_3$ in aq. solution | Treating agent used for deodorization | Reaction time | Effect at exhaust vent | Change in concentration of $Na_2CO_3$ | Supplement of water |
|---|---|---|---|---|---|---|
| a. Raw feces | 10% | Nitric acid | 100 hrs. | Odorless | unchanged | none |
| b. Raw feces | 5% | " | 150 hrs. | " | " | " |
| c. Soil water from raw trashcan refuse tank | 10% | " | 200 hrs. | " | " | " |
| d. Soil water from raw trashcan refuse tank | 5% | " | 300 hrs. | " | " | " |
| e. Septic matter of fishes, giblets, plunks, bones and meats | 10% | " | 100 hrs. | " | " | " |
| f. Septic matter of fishes, giblets, plunks, bones and meats | 5% | " | 200 hrs. | " | " | " |
| g. Mixture of raw feces | 10% | " | 100 hrs. | " | " | " |

TABLE 1-continued

| Material producing offensive odor | Concentration of $Na_2CO_3$ in aq. solution | Treating agent used for de-odorization | Reaction time | Effect at exhaust vent | Change in concentration of $Na_2CO_3$ | Supplement of water |
|---|---|---|---|---|---|---|
| and separated solution | | | | | | |
| h. Mixture of raw feces and separated solution | 5% | " | 200 hrs. | " | " | " |

TABLE 2

Results obtained when sulfuric acid and other materials were treated:

| | | | | | | |
|---|---|---|---|---|---|---|
| a. | Sulfuric acid | 10% | Raw feces | 100 hrs. | Odorless | unchanged | none |
| b. | Sulfuric acid | " | Soil water of pit in combustion plant | 100 hrs. | " | " | " |
| c. | Sulfuric acid | " | Septic matter of fishes, plunks, meats inc. | 100 hrs. | " | " | " |
| d. | Separated solution | " | Nitric acid | 200 hrs. | " | " | " |
| e. | Separated solution | " | Nitric acid | 300 hrs. | " | " | " |
| f. | 33% aq. ammonia | " | Nitric acid | 100 hrs. | " | " | " |
| g. | Formaline | " | Nitric acid | 100 hrs. | " | " | " |
| h. | Ammonia " | " | Nitric acid | 10 hrs. | An odorless white gas is come out. | " | |

EXAMPLE 8

Now, in this example, a storage soil water of swear pit at a combustion plant was deodorized with a strong acidic waste water (pH 3.8 to 4.0) by using the apparatus described in EXAMPLE 7, and then the water treatment was carried out. The results obtained are as follows:

| Amount of soil water | Amount of waste water | Deodorizing effect at a distance of 20 cm | pH | Offensive odor | Color |
|---|---|---|---|---|---|
| a. 1,000 cc | 30 cc | odorless | 7.5 | none | brown |
| b. 2,000 cc | 600 cc | " | 7.5 | " | " |
| c. 2,000 cc | 500 cc | slight odor | 6.8 | " | " |

The change in BOD of the waters which had been deodorized as described above by treating with a flocculating agent:

| | Initial BOD | Amount of flocculating agent added | BOD after 2 hrs. from treatment | BOD after retreated |
|---|---|---|---|---|
| a. | 40,000 ppm | 0.4 ppm | 205 ppm | 5 ppm |
| b. | " | 0.5 ppm | 180 ppm | 3 ppm |
| c. | " | 0.3 ppm | 300 ppm | 12 ppm |

Flocculating treatment of the separated water and its visibility:

| Amount of separated water | BOD value | Amount of deodorizing agent added | $H_2S$ | BOD after flocculating treatment | Visibility |
|---|---|---|---|---|---|
| a. 1,000 cc | 1,100 ppm | 20 cc | not detected | 2 ppm | >30 |
| b. 1,000 cc | 800 ppm | 20 cc | not detected | 1 ppm | >30 |

EXAMPLE 9

In this example, only hydrogen sulfide was decomposed and removed and methane gas usable for a fuel was recovered. In this case, oxygen produced by vaporizing liquid oxygen was used as the treating agent. The amount of hydrogen sulfide contained in a gas produced in a digestion vessel was from 10,000 ppm to 11,000 ppm and methane gas was contained in an amount of about 60%. The pump used was a laboratory pump with a rate of 20 l/min. The results obtained after treatment of 10 hrs. were as follows:

| Material to be treated | Content of $H_2S$ | Concentration of $Na_2CO_3$ in aq. solution | Treating agent | Removing ratio of $H_2S$ | Purity of methane gas according to burning characteristics |
|---|---|---|---|---|---|
| a. Gas produced in digestion vessel | 10,000 ppm | 10% | Liquid oxygen | 100% | good |
| b. Gas produced in digestion vessel | 11,000 ppm | 10% | Liquid oxygen | 100% | " |

Experiments were carried out by using an aqueous solution of sodium percarbonate or an alkaline aqueous solution of hydrogen peroxide under a condition of gas feeding rate of 20 per min. for removing offensive odors produced from raw feces charged in a storage tank. These experiments proved that the effect of deodorization and decomposition of injurious gases can not be attained with an aqueous solution of sodium percarbonate or an alkaline aqueous solution of hydrogen peroxide because of the extinction of oxygen radical constituting hydrogen peroxide and that such aqueous solutions bring about an evil effect because the hydrogen peroxide is decomposed to give water and sodium carbonate is accumulated. The results obtained after treatment for more than 100 hrs. are given as follows:

| Material to be treated | Aq. $Na_2C_2O_6$ or alkaline aq. $H_2O_2$ | Amount of solution used | Change after 30 hrs. | After adding $H_2NO_3$ mist |
|---|---|---|---|---|
| a. Raw feces | 30% | 1.5 l | come out with offensive odor | oderless |

After the extinction of oxygen radical of hydrogen peroxide, the following changes were observed.

| Material to be treated | Alkaline aq. solution of $H_2O_2$ | Amount of solution used | After 32 hrs. | After 40 hrs. |
|---|---|---|---|---|
| b. Raw faces | 30% | 1.5 l | come out with offensive odor | impossible to deodorize |

In case b, it is required to continuously add the alkaline aqueous hydrogen peroxide, and a large amount of hydrogen peroxide consumed and extinguished in the above method will cause a substantial disadvantage for the economy in resources.

It has been found that neither alkaline aqueous solution of hydrogen peroxide or aqueous solutions of sodium percarbonate could decompose injurious substances such as nitric acid, sulfuric acid and sodium hypochlorite.

When an alkaline aqueous solution of hydrogen peroxide is used, a huge amount of the solution used will be calculated, if added 1 per sec., as follows: 60 l per min., 1,440 l per day, 43 tons and 200 l per month, and 558 tons and 400 l per year.

As apparent from the above descriptions, according to the present invention, it is unnecessary to supplement sodium carbonate, with the exception of particular cases, owing to the catalytic action of sodium carbonate, and therefore water used in the first place for the reaction may be recycled.

Since the present invention provide a treating method which creates no secondary and tertiary pollutions, it appears to make a great contribution towards industrial development.

Lastly, there are given in the following table the change, i.e. increase or decrease, in an aqueous solution of sodium carbonate. This experiment was carried out for treating a gas comprising, for example hydrogen sulfide and the line, produced from an separated solution by using nitric acid mist. Also, five reaction vessels containing the above aqueous solution and a pressure or suction pump of a rate of 20 l/min. for pumping the injurious gas of offensive odor were used.

| Reaction system used | Concentration of $Na_2CO_3$ | Pumping rate of nitric acid mist | Amount of aqueous solution in | | | | |
|---|---|---|---|---|---|---|---|
| | | | 1st vessel | 2nd vessel | 3rd vessel | 4th vessel | 5th vessel |
| Separated solution and nitric acid Amount of aq. solution | 5% | 2 pumps each 6 l/min. | 1,050 g | 1,050 g | 1,050 g | 1,050 g | 1,050 g |
| Change Increase or decrease | | | 1,013 g −37 g | 1,041 g −9 g | 1,047 g −3 g | 1,053 g +3 g | 1,061 g +11 g |

From the above results, it may be deduced that the gas of offensive odor and nitric acid mist, which had been pumped by means of the two pressure pumps of 6 l/min. rate and the pressure or suction pump of 20 l/min. rate, respectively and contained in the separated solution, were mixed and contacted with each other in the aqueous solution of sodium carbonate to give water, and at the same time a number of supergaseous particles (pH 7.0, tasteless and odorless) among the gas and air which were pumped and left through an exhaust vent consisted of vaporized water, which may be converted into water by cooling. While specific embodiments of the invention have been shown and described in detail to illustrate the application of the principles of the invention, it will be understood that the invention may be embodied otherwise without departing from such principles.

I claim:

1. An apparatus for decomposing injurious gaseous substances to form a non-injurious substance comprising means defining a reaction gas liquid contact tower having a lower portion for holding a reservoir including an aqueous solution of sodium carbonate and an upper portion disposed above said reservoir, inlet means for passing the injurious gaseous substances to be treated into said upper portion, a plurality of spray nozzles for spraying said aqueous solution into said upper portion above said inlet means to contact the gaseous substances, a plurality of serially interconnected reaction vessels, each of said vessels having means for maintaining and holding a reservoir of said aqueous solution at a predetermined level, conduit means for maintaining a predetermined level of said aqueous solution in said tower and for passing said aqueous solution from said tower connecting said lower portion of said tower and one of said interconnected reaction vessels to establish fluid communication between the respective reservoirs thereof, gas discharge means connected to said upper portion of said tower and one of said reaction vessels for supplying at least part of said gaseous substances into the reservoir of said reaction vessel, said gas discharge means having a discharge output without said reservoir of said reaction vessel, pump means for passing gaseous substances from above the level of said reservoir of one of said reaction vessels to below the level of the reservoir of another of said reaction vessels, a mixing vessel connected to at least one of said reaction vessels for receiving said solution therefrom, means for supplying only one of a hydrogen donor or oxygen donor substance to said mixing vessel, mixer means in said mixing vessel for mixing said donor substance and said solution to form a mixture, mixture pump means for passing said mixture to said plurality of spray nozzles, means for separating water from said mixing vessel, and a water purifier means connected to said mixing vessel for purifying water.

* * * * *